United States Patent
Spykerman et al.

[11] Patent Number: 5,505,516
[45] Date of Patent: Apr. 9, 1996

[54] COMPACT CONTAINER HOLDER

[75] Inventors: David J. Spykerman, Zeeland; Scott S. Bainbridge, Byron Center; John K. R. Barlow; Russell P. Shafer, Jr., both of Holland, all of Mich.

[73] Assignee: Prince Corporation, Holland, Mich.

[21] Appl. No.: 213,231

[22] Filed: Mar. 15, 1994

[51] Int. Cl.$^6$ ...................................................... A47C 7/54
[52] U.S. Cl. .............................. 248/311.2; 297/188.14
[58] Field of Search ................... 297/188.14, 188.19, 297/188.01; 248/311.2, 293; 224/42.45 R

[56] References Cited

U.S. PATENT DOCUMENTS

| | | | |
|---|---|---|---|
| 3,104,131 | 9/1963 | Krone | 297/188.19 X |
| 3,215,467 | 11/1965 | McFarland et al. | |
| 3,771,754 | 11/1973 | Swartz | |
| 4,286,742 | 9/1981 | Pellegrino | |
| 4,453,759 | 6/1984 | Kathiria | |
| 4,728,018 | 3/1988 | Parker | |
| 4,756,572 | 7/1988 | Dykstra et al. | |
| 4,792,184 | 12/1988 | Lindberg et al. | 297/188.19 X |
| 4,796,791 | 1/1989 | Goss et al. | |
| 4,848,627 | 7/1989 | Maeda et al. | 248/311.2 X |
| 4,927,108 | 5/1990 | Blazic et al. | |
| 4,928,865 | 5/1990 | Lorence et al. | 248/311.2 X |
| 5,060,899 | 10/1991 | Lorence et al. | 297/188.01 X |
| 5,072,989 | 12/1991 | Spykerman et al. | 297/188.19 X |
| 5,076,641 | 12/1991 | Lindberg | 297/188.19 |
| 5,096,152 | 3/1992 | Christiansen et al. | 297/188.19 X |
| 5,102,085 | 4/1992 | Wieczorek et al. | |
| 5,104,184 | 4/1992 | Kwasnik et al. | 297/188.19 X |
| 5,104,185 | 4/1992 | Christiansen et al. | 297/188.19 X |
| 5,104,186 | 4/1992 | Kwasnik et al. | 297/188.19 X |
| 5,190,259 | 3/1993 | Okazaki | 297/188.19 X |
| 5,248,183 | 9/1993 | Gignac et al. | |
| 5,275,779 | 1/1994 | Marfilius et al. | |
| 5,280,848 | 1/1994 | Moore | 248/311.2 X |
| 5,289,962 | 3/1994 | Tull et al. | 248/311.2 X |
| 5,318,266 | 7/1994 | Liu | 248/311.2 X |

Primary Examiner—Peter M. Cuomo
Assistant Examiner—Rodney B. White
Attorney, Agent, or Firm—Price, Heneveld, Cooper, DeWitt & Litton

[57] ABSTRACT

An apparatus for holding containers in a vehicle includes a base attachable to a vehicle, and a container holder member movably attached to the base for forming a container holder aperture over the base. An ashtray receptacle and an ashtray cover are integrated into the base, and one or two container holder members are movably mounted to the base on either side of the ashtray receptacle. The container holder members are extendable to form a container holder aperture over the ashtray receptacle with the ashtray cover supporting the bottom of a container placed in the container holder aperture. The container holder members are also retractable to a storage position in the base for aesthetics. The base can be modular and retrofittably installed into a storage compartment in an existing vehicle armrest or console, or can be installed as original equipment. The container holder members are pivotally mounted on the ashtray cover, and are pivotable about a 90° arc for movement between a storage position and a storage arm supporting position on the base. In another embodiment, a double container holder that extends longitudinally along the upper surface of an armrest or console. The double container holder pivots about an axis that extends through the container holder apertures defined by the container holder so that the container holder remains positioned over the armrest/console at all times.

16 Claims, 8 Drawing Sheets

COMPACT CONTAINER HOLDER

BACKGROUND OF THE INVENTION

The present invention relates to container holders for vehicles, and in particular container holders configured for movement between a compact storage position preferably adjacent an ashtray receptacle, and a use position for securely holding a container.

Frequently vehicles are equipped with container holders that move between a storage position for aesthetics and for maximum passenger compartment space, and a use position for optimal positioning of the container holder in the vehicle passenger compartment. However, many of the container holders require relatively complex mechanisms or cumbersome motions to extend the container holder to the use position. Also, with the limited passenger compartment space in modern vehicles, it has become increasingly difficult to locate both a container holder and an ashtray receptacle in a convenient position in the vehicle. As a result of the limited space, some vehicles do not have container holders or at least no container holders and/or ashtrays that are conveniently positioned adjacent the center and front of a front vehicle seat. For these vehicles lacking container holders and/or ashtrays, a retrofittable container holder and ashtray compatible with existing vehicle components is desired. Still further, innovative and stylistic container holder designs compatible with the aesthetic decor of a particular vehicle interior are desired.

Thus, a container holder solving the aforementioned problems is desired.

SUMMARY OF THE INVENTION

According to one aspect of the present invention, a container holder for a vehicle includes a base including an upwardly facing surface. A pair of container holder members are movably supported on the base for movement between a storage position wherein the container holder members are located within the base below the upwardly facing surface and a use position wherein the pair of container holder members are extended to a use position above the upwardly facing surface. The pair of container holder members are spaced apart and include opposing surfaces for defining a container holder aperture therebetween when in the use position. In a preferred form, an ashtray receptacle is positioned between the pair of container holder members in the base, and an ashtray cover is positioned over the ashtray receptacle for supporting a container placed between the container holder members.

In another embodiment, a container holder module is adapted to be positioned in an upwardly facing storage compartment in a vehicle component. The storage compartment includes sidewalls, and the module includes a base having sidewalls configured to extend into the storage compartment and mateably engage the storage compartment sidewalls. An aperture forming member is movably attached to the base for movement between a storage position and an extended position defining a container holder aperture with the base for receiving and supporting a container.

In another embodiment of the present invention an ashtray and container holder are integrally combined in one structure. In this embodiment, a base defines an ashtray receptacle and includes an access opening to access the astray receptacle. A cover is operably attached to the base for movement between a closed position covering the access opening and an open position uncovering the access opening. The cover includes aperture-defining surfaces configured to hold a container when the cover is in the closed position. In a preferred form, the cover includes a container holder member movably attached to the cover for movement between a storage position and a use position.

In yet another embodiment, an apparatus for holding containers in a vehicle include a console having an aperture forming an upwardly facing surface, and a container holder member is movably supported on and attached to the console. The container holder is movable between a storage position wherein the container holder member is located mateably over the upwardly facing surface to aesthetically cover the surface, and a use position wherein the container holder member is moved to a container stabilizing use position extended above the upwardly facing surface. In one form, a second container holder member is movably mounted to the console, the first and second container holder members when in the use position supporting opposing sides of a container placed on the upwardly facing surface.

Another embodiment of the present invention includes a console having recess forming walls defining a generally upwardly facing recess. A container holder member is movably mounted to the walls in the recess for movement between an armrest forming position and a container supporting position. The container holder member includes a generally planar surface for supporting a person's forearm when in the armrest forming position, and includes a configured surface defining a container holder aperture when in the container supporting position. In a preferred form, the access extends through the recess so that the container holder member is located generally over the recess when in the container supporting position and when in the armrest forming position.

These and other features, advantages and objects of the present invention will be further understood and appreciated by those skilled in the art by reference to the following specification, claims and appended drawings.

DETAILED DESCRIPTION OF PREFERRED EMBODIMENTS

Figure 1:
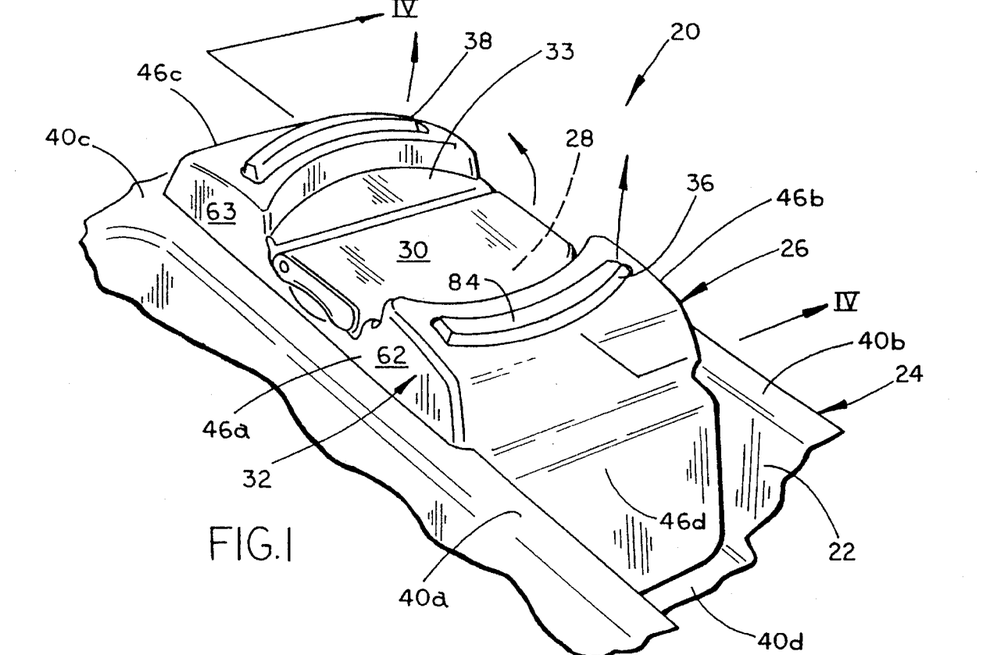
FIG. 1 is a fragmentary perspective view of an apparatus embodying the present invention, including an ashtray receptacle, an ashtray cover shown in the closed position, and a pair of movable container holder members that cooperate with the ashtray cover to define a container holder aperture.
Figure 2:
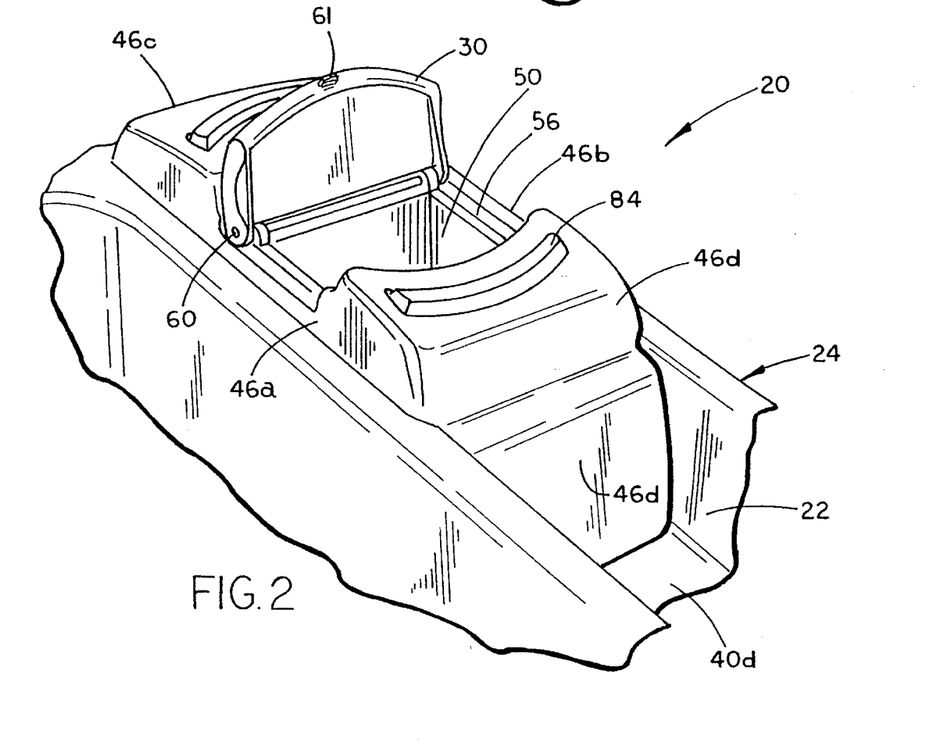
FIG. 2 is a fragmentary perspective view of the apparatus shown in FIG. 1, shown with the ashtray cover in an opened position.
Figure 3:
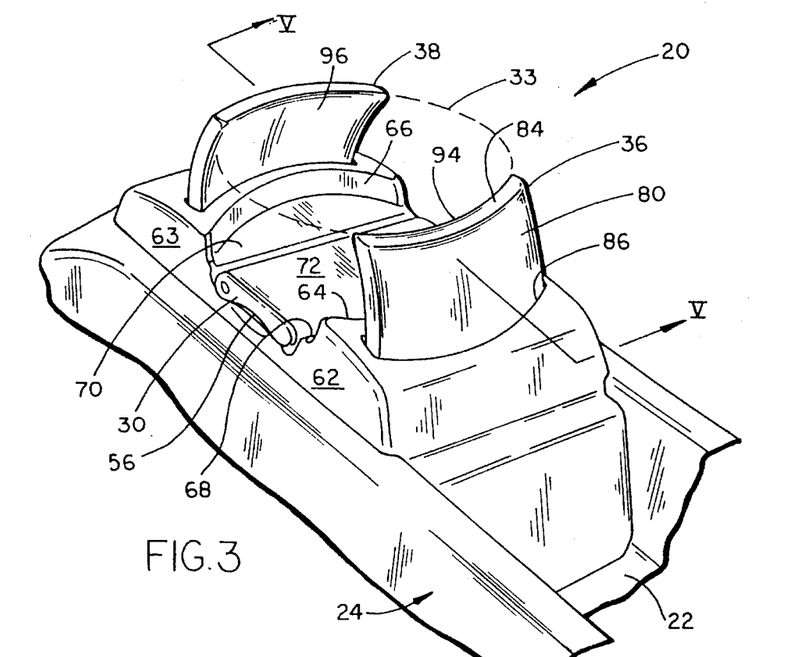
FIG. 3, is a fragmentary perspective view of the apparatus in FIG. 1 with the container holder members being shown in the extended use position.
Figures 3A, 8, 21:
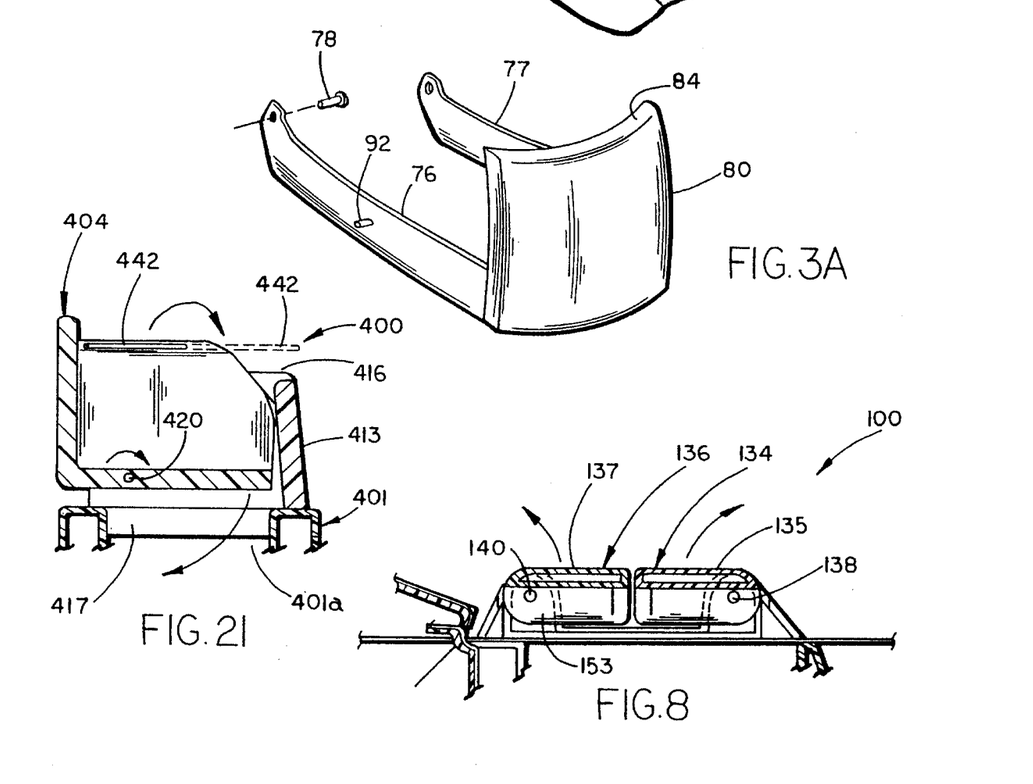
FIG. 3A is a perspective view, partly exploded, of one of the container holder members shown in FIG. 3.
FIG. 8 is a fragmentary cross-sectional view of the second embodiment taken along the plane VIII—VIII shown in FIG. 6.
FIG. 21 is a cross-sectional view taken along the plane XXI—XXI in FIG. 20.
Figure 4:
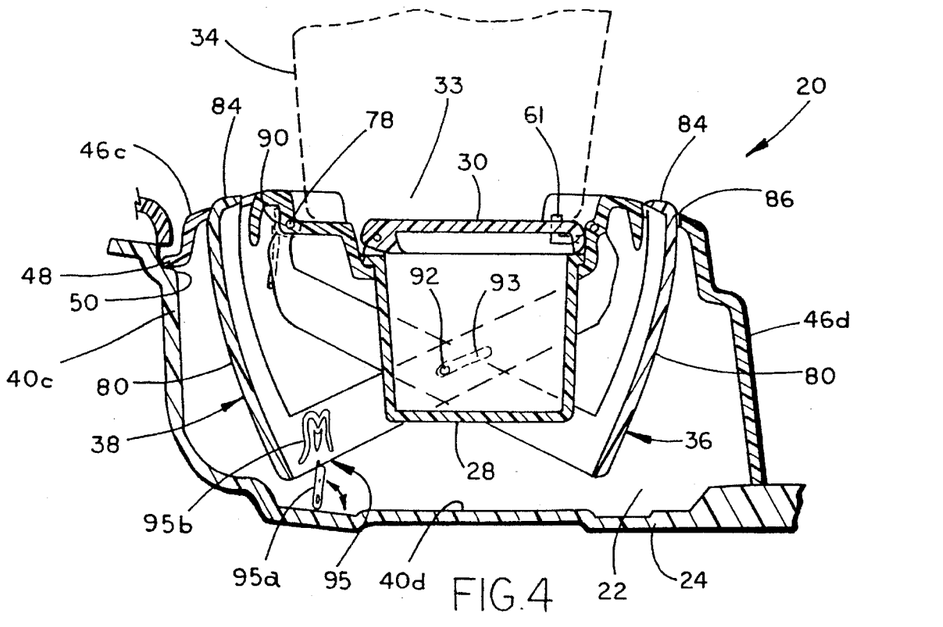
FIG. 4 is a fragmentary cross-sectional view taken along the plane IV—IV in FIG. 1.
Figure 5:
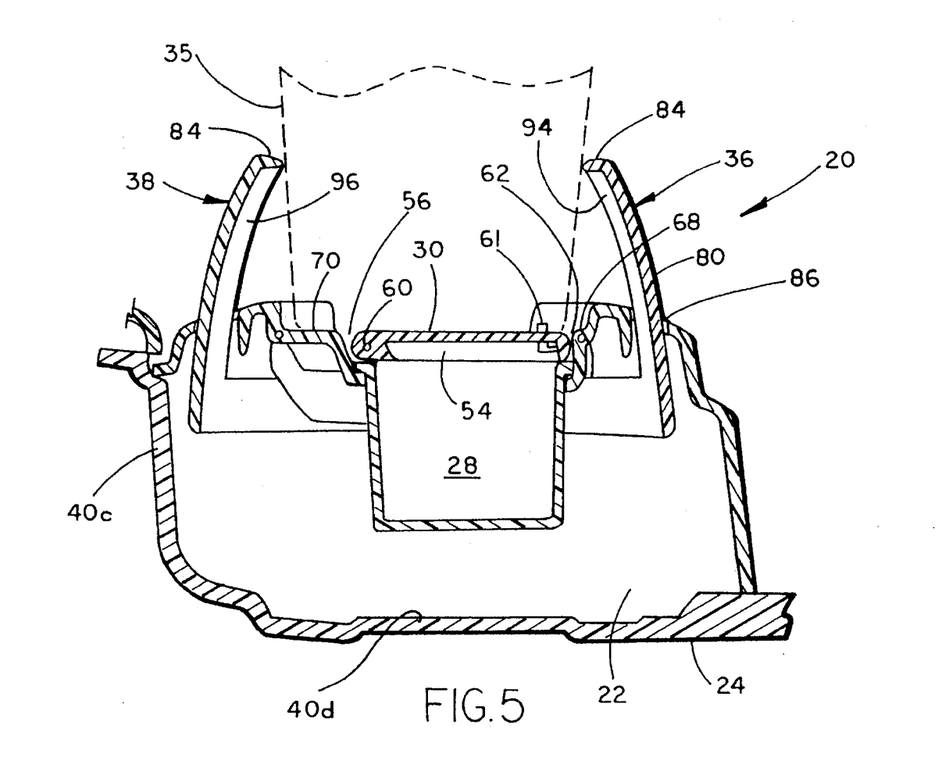
FIG. 5 is a fragmentary side cross-sectional view taken along the plane V—V in FIG. 4.

A modular apparatus 20 (FIGS. 1–5) embodying the present invention is configured for installation by an original equipment manufacturer or for retrofit installation such as by a car dealership in a storage compartment 22 of a vehicle component, such as in the illustrated storage type console 24. The apparatus 20 (FIG. 1) includes a body 26 mateably positioned in the storage compartment 22. An ashtray receptacle 28 fits within body 26, and an ashtray receptacle cover 30 is pivotally secured to body 26 for covering ashtray receptacle 28. The body 26 includes upwardly protruding wall structure 32 that extends above the ashtray receptacle cover 30 to define a container holder aperture 33 for securely holding a container such as a coffee cup or mug 34 (FIG. 4). A pair of container holder members 36 and 38 are located within body 26 on both sides of container holder aperture 33. Container holder members 36 and 38 are telescopingly extendable above wall structure 32 to provide support for the sides of tall containers such as a glass or a pop can 35 (FIG. 5). Thus, the apparatus 20 integrates an ashtray with a container holder in a functional yet aesthetically attractive way.

More specifically, the illustrated component 24 is configured to be positioned between front vehicle seats and extends forward of the vehicle seats, although the invention is contemplated to include an apparatus mounted in other locations in a vehicle. Storage compartment 22 (FIG. 1) in component 24 includes sidewalls 40a and 40b, front wall section 40c and bottom 40d which define storage compartment 22. Optionally, console 24 may include a lid (not shown) for closing and covering storage compartment 22.

Body 26 (FIG. 1) is configured to be mateably positioned within the recess 22 in component 24. In particular, body 26 includes an outer wall with sidewall sections 46a and 46b, front wall section 46c and rear wall section 46d. Sidewall sections 46a and 46b and front wall section 46c define a continuous lip 48 (FIG. 4) for mateably engaging a continuous ridge 50 that extends around the top of component sidewall sections 40a and 40b and front wall section 40c of component 24. Body rear wall section 46d extends to the bottom of the storage area 44, thus aesthetically closing off a portion of the front of storage compartment 22. Body 26 is configured to mateably frictionally press-fit within recess 22 of component 24, however it is noted that attachment tabs and the like can be added if desired. Notably, the modular configuration of apparatus 20 allows it to be retrofit into existing components such as armrests and consoles having storage compartments therein. It is contemplated that base wall sections 46a–46d could be extended downwardly and enclosed with a bottom to form an enclosed box-like unit if desired.

Ashtray receptacle 28 (FIG. 5) is located within body 26 and is formed from sheet metal or other non-combustible material. The upper portion of ashtray receptacle 28 defines an access opening 54 which aligns with an access opening 56 in the top and center of body 26. Ashtray receptacle cover 30 is pivotally connected by a hinge 60 to wall structure 32 on one side of access opening 56, and a latch 61 is connected to the opposing side of ashtray cover 30 for latching the cover in a closed position. A spring (not shown) is mounted about hinge 60 to bias ashtray cover 58 toward the open position.

Body wall structure 32 (FIG. 3) includes a pair of opposing protrusions 62 and 63 that extend above access opening 56 on the forward and rearward sides, respectively, of access opening 56. The opposing inner surfaces 64 and 66 of protrusions 62 and 63 are arcuately shaped and define a truncated container holder aperture 33 for holding a container. Ledges 68 and 70 extend parallel and flush with the upper surface 72 of ashtray cover 58 inside of and at the lower end of opposing surfaces 64 and 66. Ledges 68 and 70 and the upper surface 72 of ashtray cover 58 define a floor or support for supporting mug 34 when placed in container holder aperture 33 (FIG. 4). A piece of resilient material such as Poron can be extended inwardly from the upper part of opposing surfaces 64 and 66 to securely engage differently sized mugs or containers placed in container holder aperture 32 if desired. (For example, see Poron tabs 160 in FIG. 10.)

Container holder members 36 and 38 (FIGS. 4–5) are movably mounted within body 26 on opposing sides of ashtray receptacle 28. Container holder members 36 and 38 are mirror images of each other and operate in a substantially identical way with a scissor-like motion. Therefore, only container member 36 will be described in detail hereinafter except as needed.

Container holder member 36 (FIG. 3A) is generally L-shaped in a side view and U-shaped in a top plan view. Container holder member 36 includes an upper leg section 80 that extends about the width of ashtray receptacle 28. A pair of lower leg sections 76 and 77 extend parallel to each other from the bottom and sides of upper leg section 80 on opposing sides of ashtray receptacle 28 under wall structure 32. The ends of lower leg sections 76 and 77 are pivotally attached to body rear wall section 46d by a pivot pin 78. Upper leg section 80 is generally arcuately shaped and extends generally upwardly perpendicularly from lower leg sections 76 and 77. Body front wall section 46c (FIG. 3) includes an aperture or slot 86 for slideably receiving an end 84 of upper leg section 80. Upper leg section end 84 is configured to lie flush with the upper surface 85 of wall structure 32 when in a lowered position (FIG. 4), and is further configured to be extended upwardly telescopingly out of elongated aperture 86 to a use position (FIG. 3). A bias spring 90 (FIG. 4) is positioned on pivot pin 78 for biasing container holder member 36 to the extended position. A pin 92 in leg 76 of member 36, and a slot 93 in the corresponding leg of member 38 (FIG. 4) are operably engaged so that the container holder members 36 and 38 move simultaneously as a pair in a scissor-like fashion. A push-to-open and push-to-close latch 95 is operably attached to lower leg sections 80 of container holder members 36 and 38 for cooperating with spring 90. The illustrated latch 95 includes a pivotally mounted latching member 95a having a follower located on its free end, and an adjacent track 95b is located on sidewall 46a for engaging the roller to guide the latching member 92a between latched and unlatched positions on lower leg section 76. Such latches are generally known in the art and need not be described in detail herein for a complete understanding of the present invention. It is contemplated that latch 95 can be located a variety of different locations and positions on members 36 and 38, or that different latches can be used.

In the extended position, upper leg sections 80 of container holder members 36 and 38 extend a predetermined distance above wall structure 32 (FIG. 5). The inwardly facing opposing surfaces 94 and 96 on upper leg sections 80 define an extension above container holder aperture 33 of predetermined size and height. The extended container holder aperture is vertically aligned with first container holder aperture 33. Advantageously, opposing surfaces 94 and 96 are spaced above wall structure 32 to stably hold a relatively tall container such as a glass or pop can 35.

Having described the components and relationships of apparatus 20, the operation of apparatus 20 will be apparent to a person of ordinary skill in the art. To install apparatus 20, a body 26 is chosen for mateably engaging a storage compartment or recess 22 in a vehicle component 24. Body 26 is frictionally press-fit or otherwise secured within the storage area. To use the ashtray, latch 61 is operated to release ashtray cover 30 and cover 30 is pivoted to an open position to uncover access opening 54 in ashtray receptacle 28. To use the container holding feature, ashtray cover 30 is pivoted to a closed position causing the upper surfaces on ashtray cover 58 and on opposing ledges 68 and 70 to align. A container 34 can then be placed on opposing surfaces 64 and 66 in container holder aperture 33. If the container happens to be relatively tall such as a pop can 35, container holder members 36 and 38 are pushed and released so that they extend upwardly to a use position defining an extended container holder aperture above aperture 33. When use of the container holder members 36 and 38 is completed, container holder members 36 and 38 are pressed downwardly into elongated apertures 86 into a storage position within body wall structure 32 to provide an aesthetic appearance. Container holder members 36 and 38 advantageously allow an extended container holder aperture to be formed with a single motion by the operator. Notably, container holder members 36 and 38 are not cantilevered in front of component 24 in a position wherein they risk being damaged. Further, container holder members 36 and 38 are stored within apparatus body 26 in a compact integrated position adjacent and under ashtray receptacle 28.

A modified apparatus 100 (FIGS. 6–10) is configured for installation at the front of an armrest or in a console 102 behind a floor mounted shifter (not specifically shown). Apparatus 100 places both a covered ashtray receptacle 106 (FIG. 7) and a container holder aperture 108 (FIG. 9) at a convenient location for use, yet integrates the ashtray receptacle and container holder aperture so that they are conveniently located in a position where they do not detract from the aesthetics and interior design of the vehicle passenger compartment.

Figure 6:
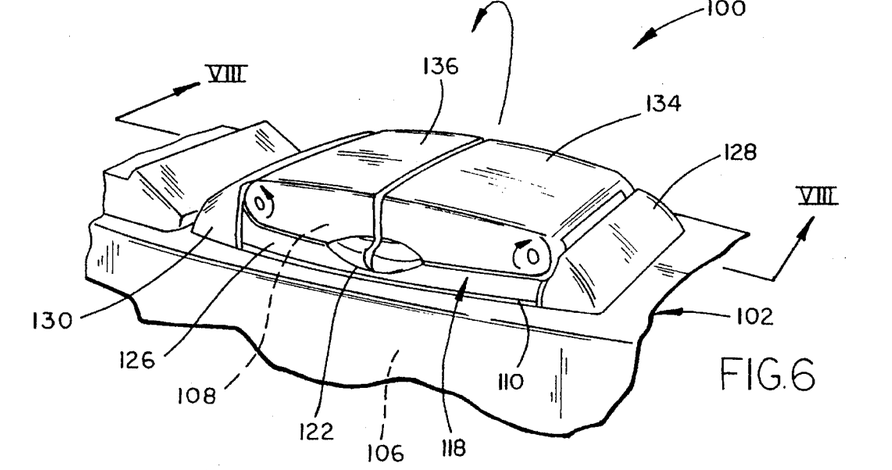
FIG. 6 is a fragmentary perspective view of another embodiment of the present invention which includes opposing pivoting container holder members operably mounted on an ashtray cover and being shown in the closed storage position.
Figure 7:
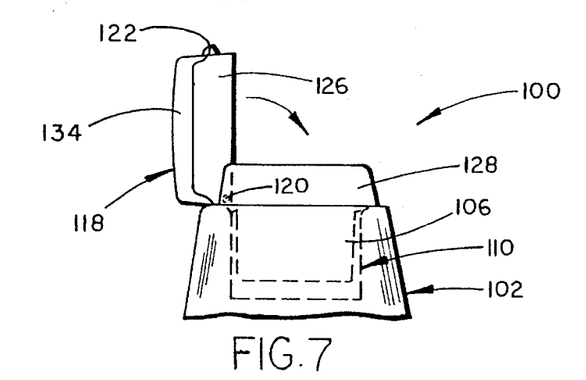
FIG. 7 is a front end view in the direction of arrow VII in FIG. 6 of the apparatus shown with the ashtray cover in the opened position.

Apparatus 100 includes a base 110 (FIGS. 6–7) configured for attachment to console 102. Base 110 (FIG. 9) includes sidewalls 112, a front wall 113, a rear wall 114 and a bottom wall 115 defining a recess. Bottom wall 115 includes flanges 117 for attachment to console 102. Ashtray receptacle 106 is formed from metal or other non-combustible materials, and is generally box-shaped for containing tobacco ashes and the like. Ashtray receptacle 106 is sized to be mateably positioned within the recess defining by base 110. Cover 118 is pivotally mounted to flanges at the top of one of sidewalls 112 by a pivot pin 120 (FIG. 7). A latch 122 is positioned on the other of sidewalls 112 opposite pivot 120. Cover 118 pivots between a recess uncovering open position (FIG. 7) and a recess covering closed position (FIG. 6).

Figure 9:
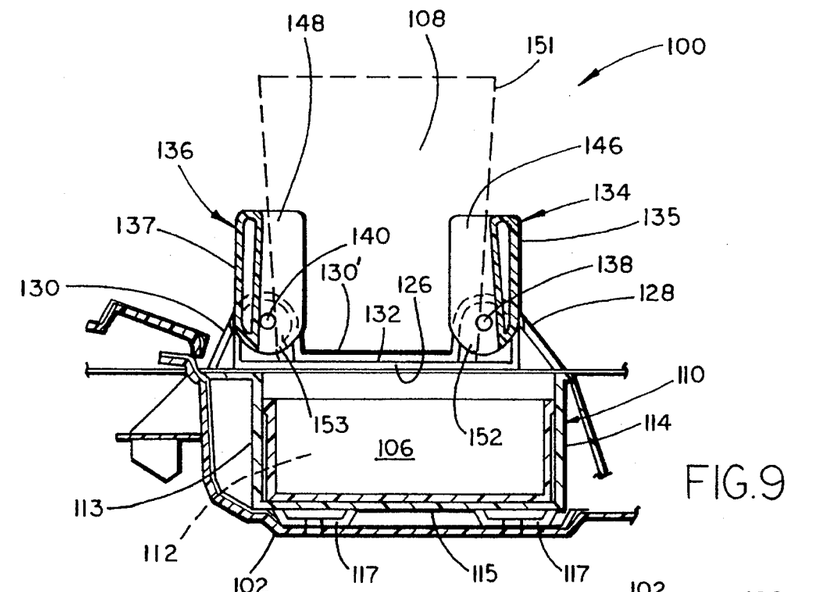
FIG. 9 is a fragmentary cross-sectional view of the second embodiment shown in FIGS. 6–8 with the container holder members being shown in the raised use position.

Cover 118 (FIG. 6) includes a lid forming main section 126 that fits between and is pivotally secured to upwardly extending lobes 128 and 130 on base 110. Main section 126 (FIG. 9) includes an upwardly facing surface 130' having a depression 132 formed therein for stably receiving the bottom of a container (34 or 35). Opposingly positioned container holder members 134 and 136 are pivotally attached to the top of cover 118. More specifically, container holder member 134 is pivotally attached at a pivot 138 for movement between a lowered storage position wherein it rests on upwardly facing surface 130 (FIG. 8) and a raised extended aperture forming position wherein member 134 is extended upwardly (FIG. 9). Similarly, container holder member 136 is pivotally attached at a pivot 140 to lobe 130 for movement between lowered and raised positions. Container holder members 134 and 136 include cushioned trim material such as vinyl, leather resin material on the show surface side 135 and 137 of members 134 and 136, respectively. Container holder members 134 and 136 also include inwardly facing configured surfaces 146 and 148, respectively, which surfaces are generally arcuately shaped for defining container holder aperture 108 (FIG. 9) when container holder members 134 and 136 are in the raised, extended position (FIG. 9). A detent 152 is located between container holder member 134 and lobe 128, and another detent 153 also between container holder member 136 and lobe 130 for frictionally holding the container holder members in the selected raised or lowered positions.

Figure 10:
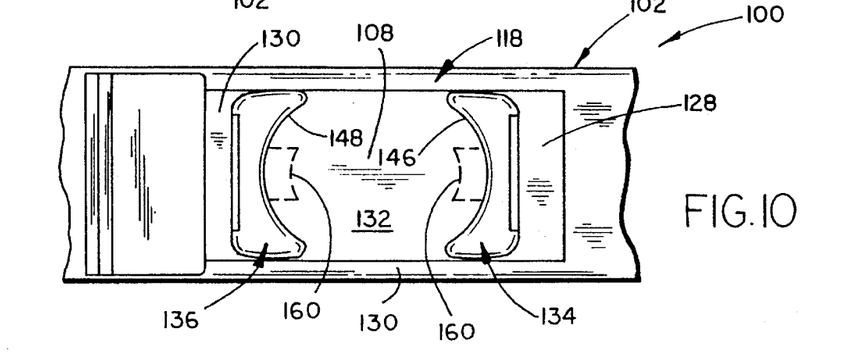
FIG. 10 is a fragmentary top plan view of the second embodiment as shown in FIG. 9, shown with the container holder members being shown in the raised position.

In operation, cover 118 can be pivoted about pivot 120 to expose the ashtray receptacle 106 for use (FIG. 7). Alternatively, cover 1.18 can be closed and container holder members 134 and 136 can be pivoted about pivots 138 and 140, respectively, to the extended position for defining container holder aperture 108 and :for stably receiving a container 151 (FIGS. 9–10). Still further, container holder members 134 and 136 can be pivoted to the lowered position such that cushion show surfaces 135 and 137 define an arm supporting surface (FIGS. 6 and 8). A tab of Poron material 160 or other flexible material can be located on surfaces 146 and 148 (shown in FIG. 10 in dashed lines) if desired for stably receiving and supporting container 151.

Figure 13:
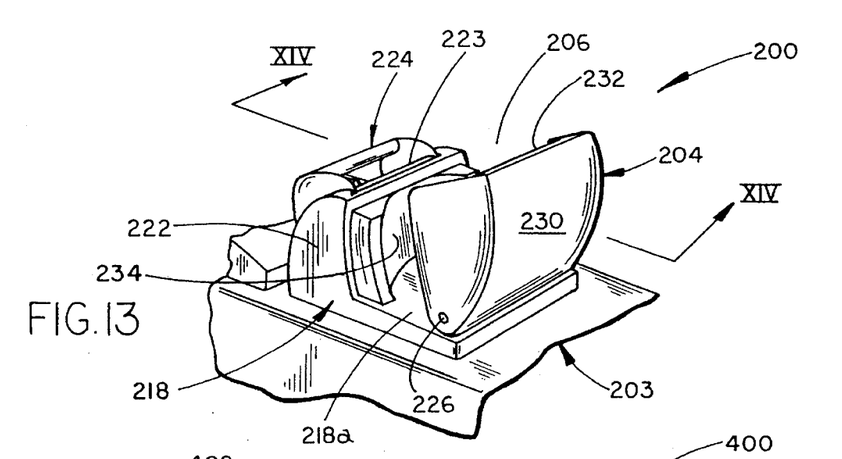
FIG. 13 is a fragmentary perspective view of the apparatus shown in FIG. 11, with the ashtray cover and the container holder being shown in the open positions.
Figure 14:
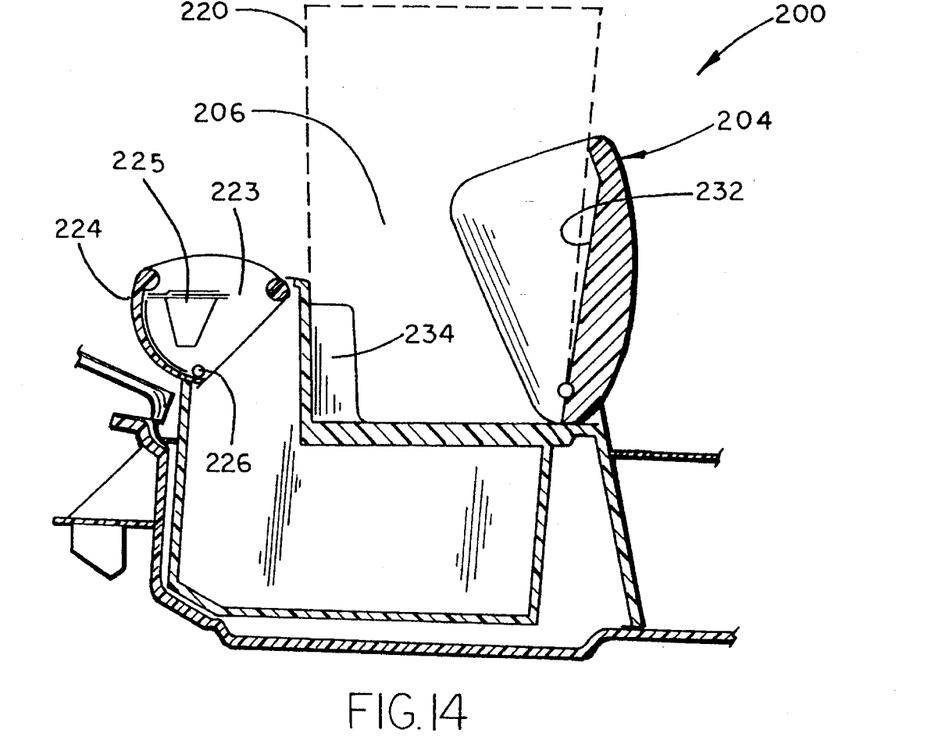
FIG. 14 is an enlarged fragmentary side cross-sectional view taken along the plane XIV—XIV in FIG. 13.

Another modified apparatus 200 (FIGS. 11–14) includes a base 202 mounted to a console 203, and a container holder member 204 pivotally attached to the top of base 202. Container holder member 204 is pivotally extendable about an arc of 90° between a storage position (FIGS. 11–12) and a use position in which member 204 defines a container holder aperture 206 above and with base 202 (FIGS. 13–14). Base 202 further defines an ashtray receptacle 208 that extends under container holder member 204. The access opening 210 for accessing ashtray receptacle 208 is located offset from the container holder aperture 206 to prevent tobacco ashes from falling into the container holder aperture and to prevent fluid being spilled from the container holder aperture area into the ashtray receptacle 208.

More specifically, base 202 (FIG. 12) includes sidewalls 212, a front wall 214, a rear wall 215 and a bottom wall 216. Front and rear walls 214 and 215 include attachment flanges 214a and 215a respectively for secure retention of base 202 to the vehicle console 201. An upper wall structure 218 (FIG. 13) is connected to the top of sidewalls 212 and 213 and front wall 214. Wall structure 218 includes a rear portion 218a configured to support a container placed thereon, such as a coffee cup or container 220 (FIG. 14). The front portion of wall structure 218 (FIG. 12) includes an upwardly protruding hollow section 222 defining an access to ashtray receptacle 208. The top of protruding section 222 defines an access opening 223, and an ashtray cover 224 is pivotally mounted by a hinge or pivot 226 located generally at the top and front of protruding section 222. Cover 224 is pivotally movable between a closed position covering the access opening 223 to ashtray receptacle 208 and an open position uncovering the access opening 223. A non-combustible cigarette support 225 is attached to the inside of cover 224 to support a lighted cigarette or for receiving a lighted end of a cigarette for putting out the lighted cigarette when cover 220 is in the open position.

Figure 12:
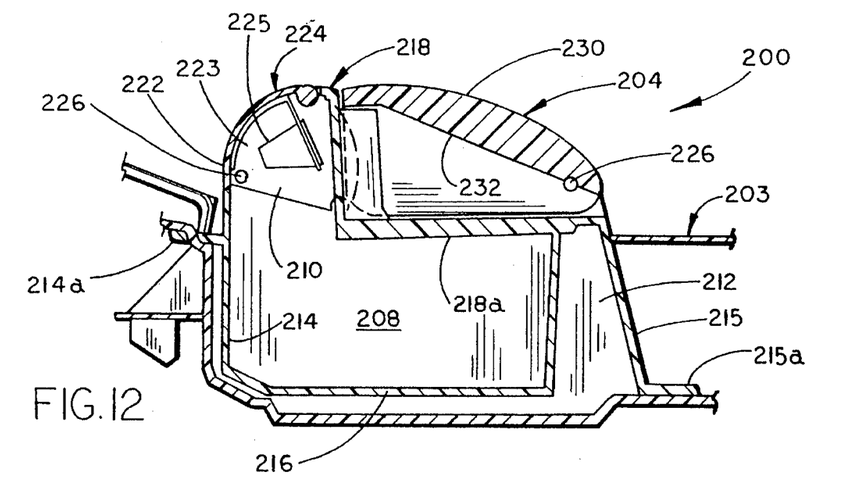
FIG. 12 is an enlarged fragmentary side cross-sectional view taken along the plane XII—XII in 11.

Container holder member 204 is pivotally mounted to rear portion 218a of wall structure 218 by a pivot pin 226 (FIG. 12). Container holder member 204 is pivotally movable between a raised position defining a container holder aperture 206 and a lowered position whereat it provides an arm rest or palm support. The upper part of container holder member 204 includes an armrest support forming outer surface 230 that is cushioned and is treated or covered to match the interior decor of the vehicle. The container holder member 204 further includes a container holder aperture-defining inner surface 232 opposite outer surface 230. With container holder member 204 pivoted to the raised position, aperture-defining surface 232 is positioned opposite an arcuate surface 234 on the rear side of protruding section 222. Surfaces 232 and 234 define the container holder aperture 206.

Figure 11:
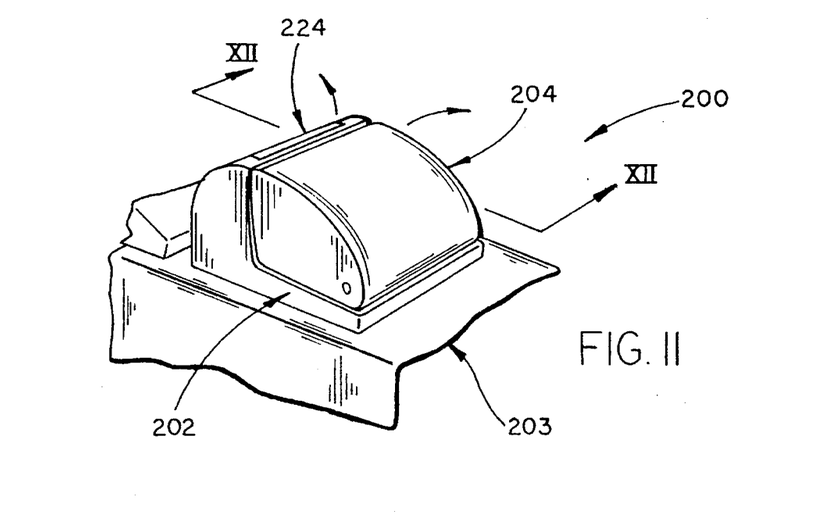
FIG. 11 is a fragmentary perspective view of a third embodiment of the present invention, shown with both the container holder member and the ashtray cover in closed storage positions.

In operation, ashtray receptacle 208 can be accessed by opening ashtray receptacle cover 224 (FIGS. 13–14). Independently, container holder member 204 can be pivoted between a raised position for stably holding a container 220 between surfaces 232 and 234 (FIGS. 13–14), and a lowered position for aesthetics (FIGS. 11–12).

Figure 15:
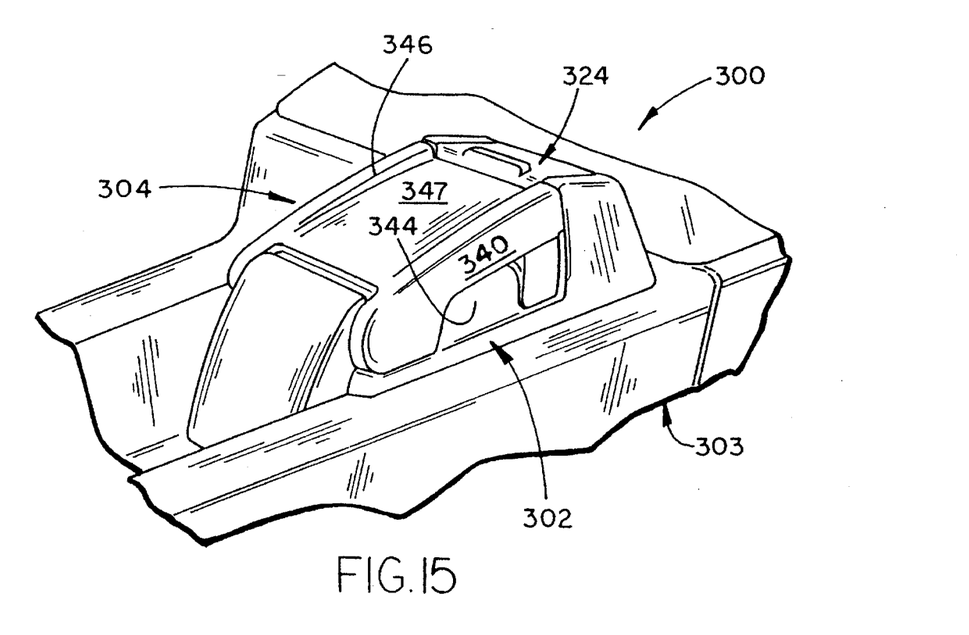
FIG. 15 is a fragmentary perspective view of a fourth embodiment of the present invention, the fourth apparatus including a container holder member and an ashtray cover, both of which are shown in the closed position.
Figure 16:
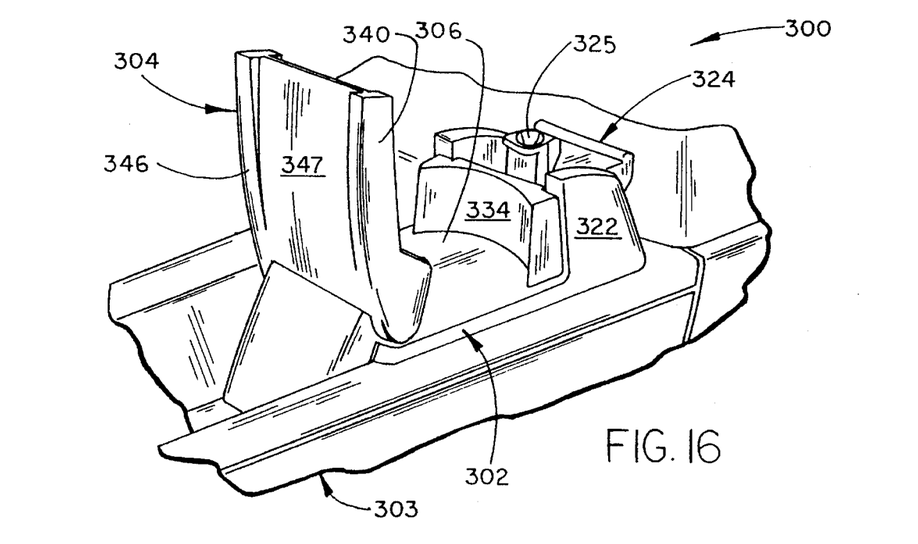
FIG. 16 is a fragmentary perspective view of the fourth apparatus shown in FIG. 15, the container holder member and the ashtray cover being shown in the open position.

Another modified container holder 300 (FIGS. 15–16) includes components very similar to modified apparatus 200. To reduce redundant discussion, components of modified apparatus 300 that are identical or very similar to modified apparatus 200 are indicated by adding 100 to the identifying numbers. For example, base 302 is not unlike base 202.

Modified apparatus 300 (FIGS. 15–16) includes a base 302 and a container holder member 304 pivotally attached to the top of base 302. Base 302 and container holder member 304 are very similar in function and their interconnection to corresponding components on modified apparatus 200, with the following exceptions. Container holder member 304 includes an elongated section 340 that when member 304 is in the closed position, extends between pivot 326 and the top of wall structure 318 in a manner that leaves a gap or opening 344 (FIG. 15) under container holder member 304 above base 302. Gap 344 allows storage of materials under container holder member 304 such as gloves, sunglasses, keys or the like. A bias spring (not specifically shown) on container holder member 304 biases container holder member 304 toward the closed position, thus clamping items such as gloves placed under container holder member 304 in a secure position. Also, the upper surface 346 of container holder member 304 includes a depression 347 configured to stably hold a cigarette or the like with the burning end of the cigarette extending over ashtray receptacle opening 322. In the open position, aperture-defining surface 332 cooperates with the arcuate surface 334 on the rear side of protruding section 322 of wall structure 318 to define container holder aperture 306.

Figure 17:
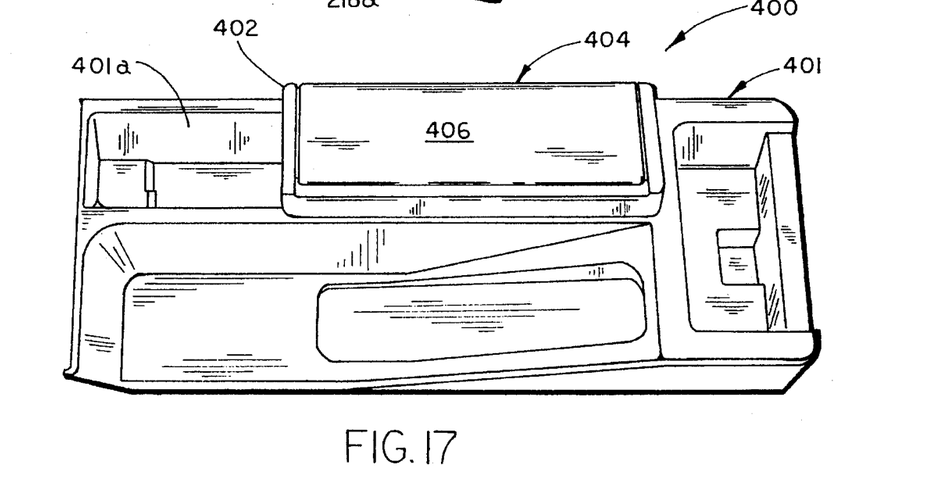
FIG. 17 is a perspective view of a fifth embodiment of the present invention including a recess forming member attached to a console, and a container holder member movably supported on the recess forming member, the container holder member being in the closed armrest forming position.
Figure 18:
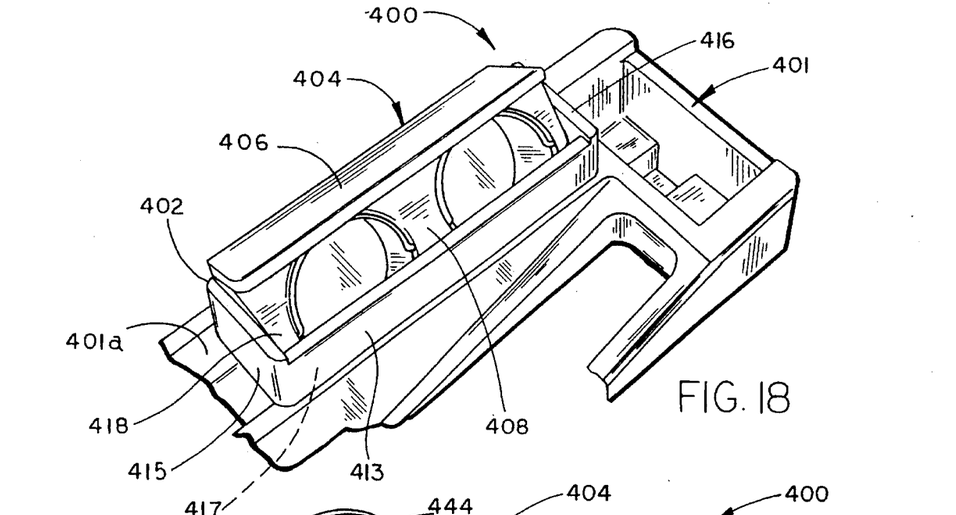
FIG. 18 is a fragmentary perspective view of the fifth embodiment shown in FIG. 17, the container holder member being shown in a partially open position.
Figure 19:
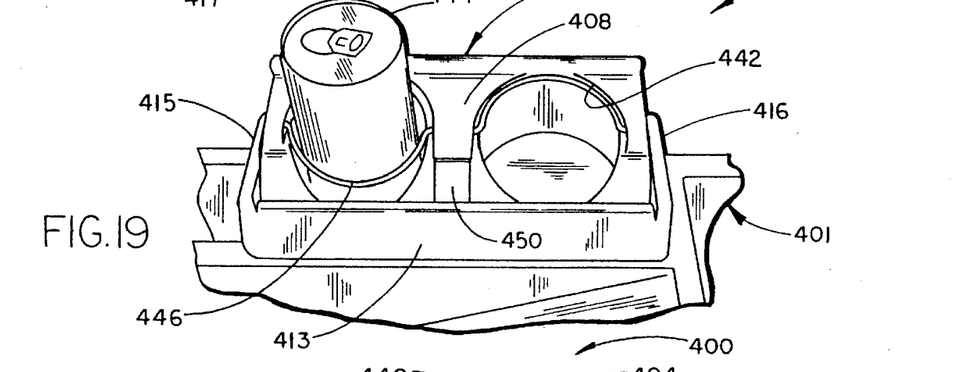
FIG. 19 is a fragmentary perspective view of the fifth apparatus shown in FIG. 18, the container holder member being shown in the full open position and one of the bails being shown in the extended position.
Figure 20:
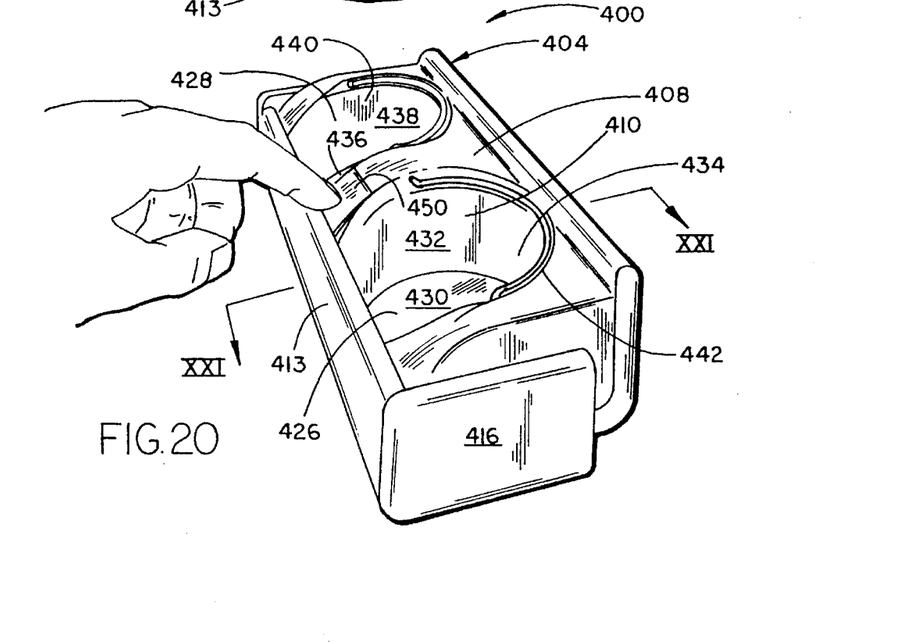
FIG. 20 is a fragmentary perspective view of the apparatus shown in FIG. 19 including the latch mechanism for holding the container holder member in the open position.

A fifth modified apparatus 400 (FIGS. 17–21 ) includes a console 401 including a compartment 401a, a recess forming member 402 securely mounted to the upper surface of console 401 partially in but extending above compartment 401a, and a container holder member 404 pivotally mounted to recess forming member 402. Container holder member 404 includes an armrest forming surface 406 (FIG. 17) and a container holder aperture forming surface 408 (FIG. 19). Container holder member 404 is mounted for pivotal movement within recess forming member 402 so that container holder member 404 can be selectively positioned with either surface 406 or 408 in an upwardly facing position.

More particularly, recess forming member 402 (FIG. 18) includes a sidewall 413, a front wall 415, a rear wall 416 and a bottom wall 417 defining a recess 418. Bottom wall 417 is configured for secure attachment to the upper surface of console 401. Container holder member 404 is pivotally mounted within recess 418 by pivots 420 (FIG. 21) that extend into front and rear walls 415 and 416, respectively. Notably, pivots 420 define an axis of rotation that extends through recess 418'so that container holder member 404 remains substantially within or above recess 418 during rotation of container holder member 404.

Container-aperture-defining wall 410 of container holder member 404 (FIG. 19) includes depressions 426 and 428 located longitudinally adjacent each other. Depressions 426 and 428 are generally identical in shape. Depression 426 includes a floor 430 and an arcuate surface 432 extending around and above floor 430 to define a truncated container holder aperture 434. Similarly, depression 428 includes a floor 436, and an arcuate surface 438 extending around and above floor 436 to define a second truncated container holder aperture 440. Notably, when container holder member 404 is in the container holder aperture forming position, the sidewall 413 of recess forming member 402 defines a portion of container holder apertures 434 and 440 at the truncated sides of apertures 434 and 440. For further stability, a semicircular bent wire or bail 442 (FIGS. 19 and 21) is pivotally secured at opposing sides of arcuate surface 432. Bail 442 is pivotable between a stored position wherein it is positioned within and against the deeper portion of arcuate surface 432, and an extended use wherein it is positioned above the shallower portion of arcuate surface 432 to provide increased stability for retaining a container 444 placed within arcuate surface 432. A second bail 446 is similarly positioned on arcuate surface 438. Notably, the upper surface 408 of container-aperture-defining is angled when container holder member 404 is in the aperture forming use position. Apertures 434 and 440 are truncated to allow compact storage of container holder member 404 within recess 418 when container holder member 404 is pivoted into recess 418.

To operate apparatus 400, container holder member 404 is pivoted to an aperture forming position (FIG. 18) and one or both of bails 442 and 446 are pivoted to the extended position for supporting containers. When finished using apparatus 400 as a container holder, container holder member 404 is pivoted to the armrest forming position so that armrest forming surface 406 is located in the upwardly facing position. A latch 450 (FIG. 19) selectively holds container holder member 404 in the container holder support position, and a second latch 452 (FIG. 16) holds container holder member 404 in the armrest support position.

Thus, there are provided container holders which are movably mounted to a vehicle component, the container holders including container holder members that are extendable to form container holder apertures and which are moveable to storage positions. Several of the container holders are integrated with an ashtray for convenient use while maintaining the aesthetic appearance of the container holder member and maintaining the ashtray function. The container holders are conveniently located in or over an armrest or console, which minimizes intrusion of the container holders into a vehicle passenger compartment.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. An apparatus for a vehicle comprising:
   a base for attachment to a vehicle, said base defining a receptacle and an access opening for accessing said receptacle; and
   a cover operably attached to said base for movement about a first axis of rotation between a closed position substantially covering aid access opening to thus prevent access to said receptacle and an open position uncovering said access opening, said cover including an upper surface configured for supporting a container when said cover is in said closed position,
   at least one container holder member pivoted to the upper surface of said cover for movement between an upright container-holding position with said cover remaining in said closed position and a lowered storage position covering the upper surface.

2. An apparatus as defined in claim 1 wherein said cover includes a bottom section and a container holder member movably attached to said bottom section, said container holder member including said shaped surface, said container holder member being movably between a use position wherein said shaped surface is positioned for use, and a storage position wherein said shaped surface is positioned against said bottom section for aesthetics.

3. An apparatus as defined in claim 2 including a pair of said container holder members, said pair of container holder members when in said use position defining a container holder aperture and being configured to support opposing sides of container placed in said container holder aperture.

4. An apparatus for a vehicle comprising:
   a base adapted for attachment to a vehicle, said base defining an ashtray receptacle and an access opening for accessing said astray receptacle; and
   a cover operably attached to said base for movement between a closed position covering said access opening and an open position uncovering said access opening, said cover including a shaped surface configured to hold a container when said cover is in said position, said cover including a bottom section and a container holder member being movably attached to said bottom section, said container holder member .including said shaped surface, said container holder member being movably between a use position wherein said shaped surface is positioned for use, and a storage position wherein said surface is positioned against said bottom section for aesthetics; and
   said container holder member being pivotable about a first axis of rotation and said bottom section being pivotable about a second axis of rotation, said first and second axes being oriented perpendicularly to each other.

5. An apparatus for holding containers in a vehicle comprising:
   a console including an upwardly facing surface; and
   a container holder member pivotally supported on and attached to the upwardly facing surface of said console for about 90° movement between a storage position wherein said container holder member is located mateably against said upwardly facing surface and a use position wherein said container holder member is extended above said upwardly facing surface, said container holder member including an arcuately shaped surface defining a container holder aperture when in said use position and further including a support surface opposite said shaped surface configured for comfortably supporting a person's arm when in the storage position.

6. An apparatus as defined in claim 5 including an ashtray located in said console generally under said container holder member.

7. An apparatus as defined in claim 5 wherein said console includes an upwardly protruding wall structure defining a part of said upwardly facing surface, said wall structure including a second shaped surface configured to cooperate with said first mentioned shaped surface to support opposing sides of a container placed in said aperture.

8. An apparatus as defined in claim 7 including an ashtray in said console, said wall structure defining an access opening to said ashtray.

9. An apparatus as defined in claim 8 including an ashtray cover pivotally mounted to said wall structure for covering said access opening.

10. An apparatus as defined in claim 5 wherein said container holder member is pivotally connected to said console for movement along an arc of about 90°.

11. An apparatus for a vehicle comprising:

an elongated base configured for attachment adjacent a seat in a vehicle and including an upper surface; and a support member pivotally mounted to the upper surface of said base for movement along an arc of about 90° between a lowered first position and an upright second position, said support member including a first surface configured for supporting a person's arm when in said first position and a arcuately shaped second surface configured to support a container when in said upright second position.

12. An apparatus as defined in claim 11 including a second support member pivotally mounted to the upper surface of said base opposite said first-mention support member for movement between first and second positions corresponding to the first and second positions of the first-mentioned support member.

13. An apparatus as defined in claim 12 wherein said base defines a longitudinal direction and a lateral direction, said support members being pivotable about axes that extend parallel said lateral direction.

14. An apparatus as defined in claim 12 wherein said support members include ends that are positioned generally adjacent each other when said support members are in the first position but that are spaced apart when said support members are in the second position.

15. An apparatus as defined in claim 11 wherein said support member is elongated and is oriented generally horizontally when in said first position and generally vertically when in said second position.

16. An apparatus for a vehicle comprising:

a base adapted for attachment to a vehicle, said base defining an ashtray receptacle and an access opening for accessing said ashtray receptacle; and a cover operably attached to said base for movement about a first axis of rotation between a closed position covering said access opening and an open position uncovering said access opening, said cover including a shaped surface configured for supporting and holding a container when said cover is in said closed position, at least one container holder member pivoted to the apparatus on an upper surface of said cover for movement about at least one axis different than said first axis, said at least one axis being perpendicular to said first axis.

* * * * *